United States Patent Office 2,888,875
Patented June 2, 1959

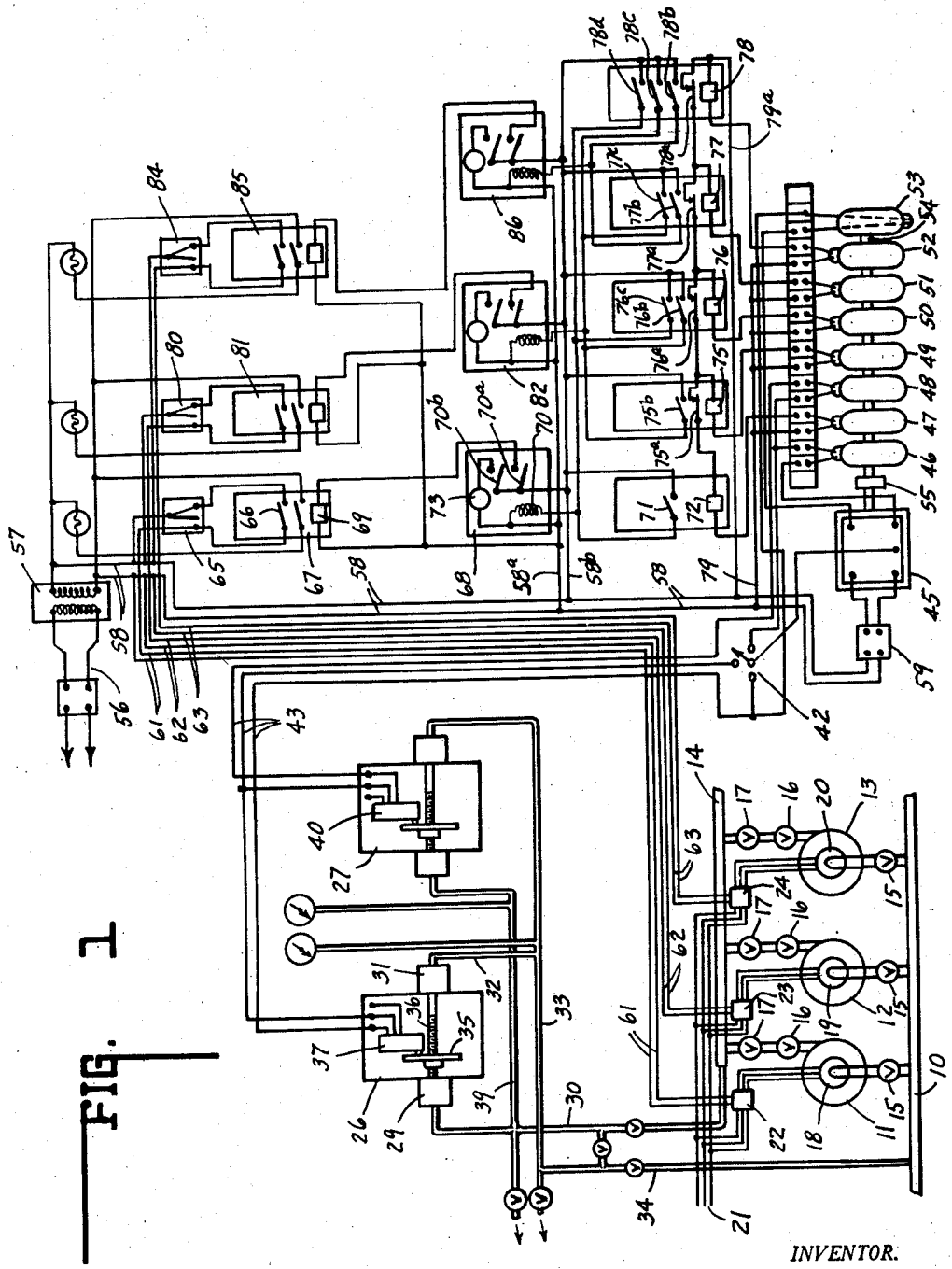

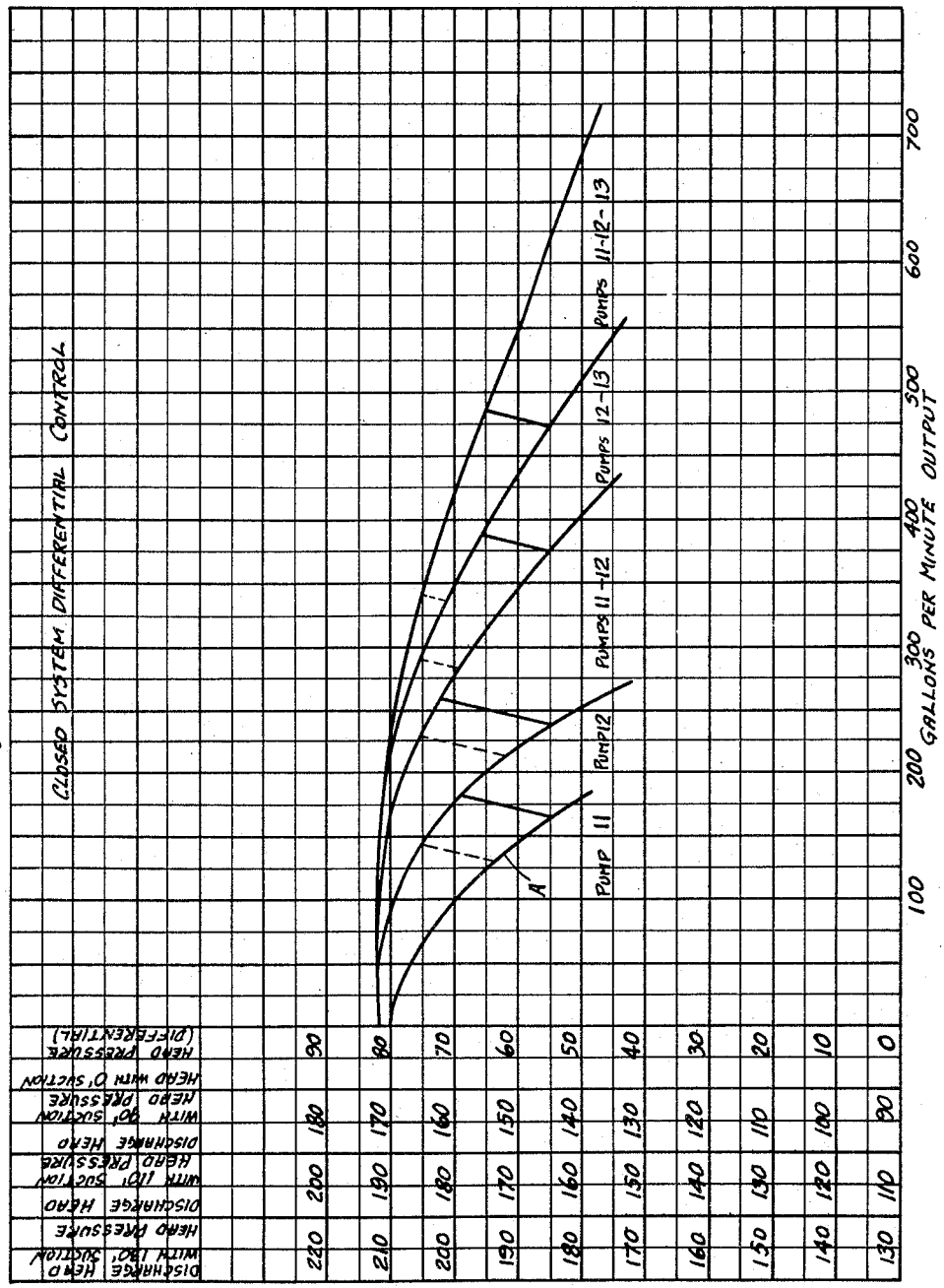

2,888,875
DIFFERENTIAL CONTROL SYSTEM FOR WATER PUMPS

Chauncey M. Buck, Indianapolis, Ind.

Application May 9, 1955, Serial No. 506,959

9 Claims. (Cl. 103—11)

This invention relates generally to pump control systems, and more particularly to a differential control system for fluid pumps in closed fluid systems. This system is an improvement over that shown and claimed in my United States Letters Patent No. 2,486,256 granted October 25, 1949, for Pump Control System.

The pump control system as provided in accordance with this invention is particularly applicable in water distribution systems utilized for supplying water in relatively tall buildings. Normal city water pressure is insufficient to supply water to the upper floors of a tall building or extension to an existing water system and, therefore, it is necessary to provide auxiliary pumps and/or a stand pipe or tank for supplying the system demand on all floors of such buildings or extended water mains.

For example, a plurality of auxiliary pumps may be utilized in systems of this type, and a control system such as that described in my previously mentioned patent may be utilized to provide a more or less uniform pressure, regardless of the system demand.

A centrifugal pump delivers its greatest volume of fluid, hereinafter referred to as water (but which may be other fluids), when the pump has a free, wide-open outlet. If the outlet is throttled, the amount of fluid delivered usually expressed as gallons per minute (g.p.m.), will be decreased and the pressure at the outlet will increase until it reaches its maximum at the shut-off or no discharge pressure of the pump. The pressures obtained by throttling the pump are normally designated as foot head or the distance up a vertical pipe, to which the pump will force water when pumping from a tank, the level of the water being the same as that of the center of the pump impeller, and the head or distance up the vertical pipe being measured from the center of the pump impeller. If the pump draws water from a tank, the water level of which is X feet below the center of the pump impeller, the distance from the center of the pump impeller to the height to which the pump will force water in the vertical pipe will be reduced X feet. If the water level in the tank from which the pump draws water is X feet above the center of the pump impeller, then the distance from the center of the pump impeller to the height of the water in the vertical pipe will be increased X feet. The pressures or heads at which a pump will deliver any selected g.p.m. within the pump range is, therefore, a differential pressure.

From the foregoing, it will be apparent that the output of a pump or a plurality of pumps, operating in parallel, in terms of gallons per minute, can be measured by measuring the differential pressure existing between the suction and discharge lines connected to the pumps. This type of measurement of flow is as accurate as can be obtained by the use of a flow meter. A flow meter is a very expensive device and, therefore, this system is more economical as no flow meter is needed for control of pumps.

The principal object of this invention is to provide a differential pump control system wherein system demand may be measured by the differential in pressure between the suction line and the discharge line of a pump or a plurality of parallel connected pumps, and any one of said pumps or any combination of said pumps may be started or stopped in accordance with system demand.

Another object of this invention is to provide a pump control system wherein a plurality of parallel connected pumps may be automatically started in accordance with increasing water system demand, and wherein various combinations of pumps may be started or stopped automatically without use of any form of re-set mechanism.

In accordance with this invention there is provided a differential pump control system for starting and stopping one or several parallel connected pumps comprising an electrical switching system operable automatically and selectively to control the operation of individual pumps or combinations of pumps, and electrical switching means responsive to the differential between pump suction pressure and pump discharge pressure, regardless of the absolute value of pump suction pressure or pump dishcarge pressure for initiating the operation of said electrical switching system whenever said differential pressure exceeds or falls below predetermined limits.

The full nature of the invention will be understood from the accompanying drawings and the following description and claims.

Fig. 1 of the drawing is a schematic diagram illustrating my differential pump control system.

Fig. 2 is a graph illustrating the operational range of a control system embodying this invention.

Referring to the drawings, there is provided a water distribution system consisting in part of a suction header 10 which may be connected to a city water supply or a reservoir located in a building wherein water is to be supplied to various floors. A plurality of pumps 11, 12, 13 may be connected to suction line 10 and to a discharge header 14 through conventional intake control valves 15, check valve 16 and manually operated shut-off valves 17.

Pumps 11, 12 and 13 may have different capacities, for example two hundred, four hundred and eight hundred gallons per minute, respectively. Also, it should be understood that any desired number of pumps may be provided and controlled in accordance with the fundamental concept of this invention. However, by actuating pumps 11, 12 and 13 in various combinations, it will be apparent that the output in gallons per minute of of the group of pumps may satisfy demands of two hundred, four hundred, six hundred, eight hundred, one thousand, twelve hundred and fourteen hundred gallons per minute, or demands within the output ranges of the various pumps or combinations of them.

Pumps 11, 12 and 13 may be driven by motors 18, 19 and 20, respectively, the individual motors being connected to a power line 21 through the starter switches 22, 23 and 24, respectively.

For controlling the pumps 11, 12 and 13 there is provided a pump control system having differential pressure responsive switches 26 and 27. Differential switch 26, for example, may comprise a bellows or other pressure responsive device 29 coupled to discharge pressure line 14 by a riser 30. Switch 26 may also include a pressure responsive bellows or other device 31 coupled to the suction header 10 by the riser 32 and header 33 and riser 34. An adjustable switch operating member 35 may be adjustably mounted on a screw member 36, for example, connecting the two bellows 29 and 31, whereby members 35 and 36 move lineally between members 29 and 31 in response to the differential pressure existing between suction header 10 and discharge line 14. It should be noted that members 29 and 31 oppose one another and are moved according to the difference in pressure between suction line 10 and discharge line 14 rather than in response to the absolute pressures in these lines. A single pole, single throw switch 37 may be suitably mounted in the way of movement of member 35 to be closed in response to a differential pressure of or below fifty-five feet of head.

A second differential pressure switch 27 identical to switch 26 may be coupled to the suction header 10 by means of the header 33 and riser 34, and to the discharge pressure line 14 by means of header 39 and riser 30. Switch 27 includes a single pole, single throw switch 40 which may be closed at and above a differential pressure of seventy-five feet of head. It will be understood that switch 37 opens when the differential pressure with respect to suction header 10 and discharge line 14 exceeds fifty-five feet of head and switch 40 opens when the differential pressure with respect to suction header 10 and discharge line 14 is less than seventy-five feet of head.

Switches 37 and 40 are connected to a conventional manual 4-point control switch 42 through lines 43, the switch 42 being manually operable to provide forward, reverse, automatic and neutral control of a reversible motor 45. A plurality of mercury switches 46, 47, 48, 49, 50, 51, 52 and 53 are mounted in different angular relationships to one another on the extension 54 of the motor shaft. A clutch 55 connects the shaft of motor 45 to extension 54 to provide a time delay in the actuation of switches 46 to 53 to prevent false operation thereof due to transient pressure surges in the suction header 10 and discharge line 14. Clutch 55 is a lost motion device of the type disclosed in my United States Letters Patent No. 2,486,256.

Motor 45 is directly responsive to the differential pressure switches 37 and 40. Consequently, any pressure surge which might occur when an additional pump is started in the system would actuate motor 45 to change the pump combination, provided, of course, that the pressure surge exceeded the maximum differential pressure head of seventy-five feet, for example. The lost motion clutch 55 prevents rotation of switches 46 to 53 for a predetermined period of time of thirty seconds, for example, and in that period the high pressure surge will have subsided so that the high pressure switch 40 will have opened before the control system can effect the stopping of any one or any combination of the pumps. In other words, the use of the clutch 55 prevents "hunting." The exact structure of clutch 55 is illustrated in my previously mentioned Patent No. 2,486,256.

The control system as a whole may be energized from a one hundred ten volt power line 56 through a voltage reducing transformer 57 and a pair of conductors 58. Motor 45, for example, may be coupled to line 58 through a manually operable disconnect switch 59.

The starter switches 22, 23 and 24 for motors 18, 19 and 20 may be coupled to line 58 through lines 61, 62 and 63, respectively. For controlling motor 18 of pump 11 there is provided a manually operable on-off switch 65, the contacts of which may be closed across line 61 to provide manual operation of motor 18, or which may be closed in series with the contact 66 in the switch section 67 of a time delay relay circuit which also includes a time delay switch 68. Switch 67 includes an electromagnetic relay 69 for closing contact 66 when energized.

For controlling relay 69 there is provided a time delay switch 68 which is of the type shown in U.S. Letters Patent No. 2,352,449. Switch 68 includes an electromagnet 70 coupled on one side to line 58a and supply line 58, and coupled on the other side to supply line 58 by line 58b and contacts 71 of a selector relay 72. Switch contact 70a may be connected with switching relay 69, while switch contact 70b may be connected with timing motor 73. Time delay switch 68, as illustrated by the aforementioned patent, includes a ratchet and pawl device (not shown) operated by electromagnet 70. The ratchet and pawl function when relay 72 is energized to close contacts 70a and 70b. Closure of contacts 70a functions to energize relay 69 and effect starting of motor 18. Closure of contact 70b operates timing motor 73; and when relay 72 de-energizes, the timing motor in connection with the ratchet and pawl mechanism operates to open contacts 70a and 70b after a predetermined time interval sufficient for motor 18, for example, to start and reach its normal speed.

The circuit of starter 23 for motor 19 is controlled through 62, manual control switch 80, relay switch 81, and time delay switch 82. This circuit is identical with the circuit 65, 67, 68, which has been previously described.

The starter 24 for motor 20 is energized through line 63, manually operated switch 84, relay switch 85 and time delay switch 86. This circuit is identical with the control circuit for motors 18 and 19. In order to selectively energize motors 18, 19 and 20, to provide varying pump capacities in response to system demand, a plurality of selector relays 72, 75, 76, 77 and 78 are coupled between the mercury switches driven by motor 45 and the time delay switches 68, 82 and 86.

Relay 72 is connected to line 58 through mercury switch 47 and conductor 79, and also through contacts 75a of selector relay 75, 76a of selector relay 76, 77a of selector relay 77 and 78a of selector relay 78, and through conductor 79a. Contact 71 of relay 72 is coupled to the coil of electromagnet 70 of time delay switch 68 and, therefore, when mercury switch 47 closes, pump motor 18 is energized to drive pump 11.

Selector relay 75 is connected to line 58 through mercury switch 49 and line 79 and through contacts 76a, 77a, 78a and line 79a. Contact 75b of selector relay 75 is coupled to delay switch 82 and, therefore, closure of mercury switch 49 initiates operation of motor 19 of pump 12.

Selector relay 76 is coupled to line 58 through mercury switch 50 and line 79 and through contacts 77a, 78a and line 79a. Contact 76b of selector relay 76 is coupled to relay switch 82, and contact 76c of selector relay 76 is coupled to time delay switch 68. Therefore, closure of mercury switch 50 energizes relay 76 to energize time delay switches 68 and 82 and pump motors 18 and 19 of pumps 11 and 12, thereby to drive these pumps in combination.

Selector relay 77 is connected to line 58 through mercury switch 51 and line 79 and through contact 78a and line 79a. Contact 77b of selector relay 77 is connected to time delay switch 86, and contact 77c of selector relay 77 is connected to time delay switch 82. Accordingly, when mercury switch 51 energizes selector relay 77, time delay switches 82 and 86 function to start pump motors 19 and 20 to drive pumps 12 and 13 in combination with one another.

Selector relay 78 is coupled to line 58 through mercury switch 52 and line 79, and also through line 79a. Contacts 78b, 78c and 78d are coupled to time delay switches 86, 82 and 68, respectively, thereby to energize all three of the time delay switches. Accordingly, when mercury switch 52 energizes selector relay 78, all three pumps are energized to run in combination.

In order that each of the selector relays may take sole control of the pumps, relays 75, 76, 77 and 78 include cut-off contacts 75a, 76a, 77a, and 78a, respectively, which serve to de-energize preceding relays, thereby to open their time delay switch energizing contacts. For example, when selector relay 78 is energized, its contact 78a opens, thereby de-energizing relays 72, 75, 76 and 77, even though their respective mercury switches may still be closed.

Mercury switches 46, 48 and 53 are limit switches which control forward and reverse motion of motor 45. So long as limit switch 53 is closed, motor 45 may be driven in a forward direction to close switches 47, 49, 50, 51 and 52 in succession, thereby to provide increasing pump capacities in response to increasing demand. Limit switch 48 controls reverse rotation on automatic operation only and prevents motor 45 from opening pump control switch 47, whereby pump 11 will always be energized when the other pumps are de-energized, thereby to insure that a minimum system demand will be satisfied. Limit switch 46 provides a limit on reverse rotation of motor 45 when the system is controlled manually by switch 42.

Fig. 2 of the drawings illustrates by means of a graph the gallons per minute output of the various combinations of pumps in response to various differentials and pressure between the suction header 10 and discharge line 14. It is conventional that city water supply for a relatively tall building varies from ninety feet head to 130 feet head, the average being one hundred and ten feet head. This is not sufficient to supply water to the top floors of such a building, whereby it is required that the pressure be increased from between fifty-five feet head and seventy-five feet head above the existing suction head. For economical operation only the required number and combination of pumps should be running to supply the existing demand in feet of head, or in other words, gallons per minute.

Differential pressure switches 26 and 27 control the reversible motor 45, switch 26 closing at and about a low differential pressure of fifty-five feet head. This causes the motor 45 to drive the shaft extension 54 in a forward direction to close mercury switches 47, 49, 50, 51 and 52 in succession, as required, to increase the number of pumps in operation to supply increasing system demand in terms of gallons per minute.

Thus, referring to the graph in Fig. 2, pump 11 operates on curve A to supply minimum demand, delivering sixty gallons per minute at seventy-five feet head above the suction head and one hundred and sixty-five gallons per minute at fifty-five feet head above the suction head. When the system demand increases, lowering the differential pressure feet head above suction head, differential pressure switch 26 is closed to step motor 45 through a sufficient angle of rotation to close mercury switch 49. The pump 12 is then started, thereby to increase the gallons per minute output to approximately two hundred and thirty-five gallons per minute. Meanwhile, pump 11 is stopped after a time delay provided by the time delay switch 68 so that pump 11 runs until pump 12 has come up to speed, thus preventing failure of supply during the starting period of pump 12.

If with pump 12 operating the pressure differential falls to fifty-five feet head showing increased draw off and gallons per minute, differential pressure switch 26 closes, energizing motor 45 to close mercury switch 50, thereby to operate pumps 11 and 12 in combination with one another. On the other hand, with pumps 11 and 12 running and with the occurrence of a decrease of draw off to two hundred and thirty-five gallons per minute, for example, the differential pressure exceeds seventy-five feet of head and differential pressure switch 27 closes to reverse the direction of rotation of motor 45, opening mercury switch 50 and closing mercury switch 49. Thus, pump 11 is de-energized and stops, leaving pump 12 running to supply the demand. Reference to Fig. 2 and to previous description will make it obvious as to the operation of the system to supply increasing demands and decreasing demands in terms of gallons per minute in response to changes in the differential pressures between the suction and discharge lines.

From the foregoing description it will be apparent that the differential pressure switches 26 and 27 in effect continuously reset the high and low pressure switching points as the suction pressure varies. It is not intended to limit the invention to the use of these particular differential pressure switches because the same result will be accomplished by electrically, hydraulically or pneumatically operated apparatus for changing the setting of high and low pressure switches as the suction pressure varies.

It will also be apparent that the system may include relatively small low head pumps and relatively large higher head pumps which may be substituted for one another as demand increases or decreases. Thus, an individual pump may be used instead of parallel operation of several pumps when additional gallonage and pressure is required. In this modification of the invention a high pressure differential switch and a low pressure differential switch may be operatively associated with each pump and automatically put into operation to measure the gallonage when that particular pump is in operation.

The invention claimed is:

1. In combination with a plurality of fluid supplying units each having independent power means and each connected to common discharge and suction headers and a control coupled to each power means to energize and de-energize the associated power means, the combination of high and low differential pressure operable means coupled to and responsive to suction header pressure and discharge header pressure, reversible motive means coupled to and controlled by the differential pressure operable means, means coupled to and selectively controlling the several power means individual controls, a lost motion connection between the selective means and the reversible motive means, and a time delay device operatively associated with each power control for retaining a unit to be de-energized in the energized relation until the unit to be energized becomes effective.

2. A combination as defined by claim 1 wherein the time delay device is of adjustable character for varying the time delay interval.

3. In a fluid distribution system, a suction header and a discharge header, a plurality of units to supply fluid under pressure to said system, a power source coupled to each of said units, means coupled to said power sources and said headers and operable automatically between predetermined high and low differential pressure limits for energizing or de-energizing said power sources, and means connected with each of said power sources and said automatic means to continue operation of said power sources a predetermined time after said automatic means has operated to de-energize said power sources.

4. In a fluid distribution system, a suction header and a discharge header, a plurality of units to supply fluid under pressure to said system, a power source coupled to each of said units, means coupled to said power sources and said headers and operable automatically between predetermined high and low differential pressure limits for energizing or de-energizing said power sources, and time control means connected with said automatic means and each of said power sources and operable to maintain a power source in operation a predetermined time after said source has been de-energized.

5. In a fluid distribution system, a suction header and a discharge header, a pair of pumps to supply fluid under pressure to said system, a power source coupled to each pump, means coupled to said headers and said power sources and operable automatically between predetermined high and low differential pressure limits for energizing or de-energizing said pumps, a time controlling mechanism, and means coupled to said automatic means and said time controlling mechanism for maintaining one of said pumps in operation a predetermined time after said automatic means has operated to de-energize the said one pump.

6. In a fluid distribution system, a suction header and a discharge header, a series of independently operated pumps to supply fluid under pressure to said system, means coupled to said pumps and said headers and operating automatically between predetermined high and low differential pressure limits for energizing said pumps successively, sequence control mechanism coupled to said means and operable automatically to energize said pumps in sequence, and means coupled to said first mentioned pressure operating means and said sequence control mechanism to prevent energizing of any of said succeeding pumps for a predetermined time period.

7. In a fluid distribution system, a suction header and a discharge header, a series of independently operated pumps to supply fluid under pressure to said system control, means coupled to said pumps and said headers and operating automatically between predetermined high and low differential pressure limits in said headers for energizing and de-energizing said pumps successively, sequence control mechanism coupled to said means and operable automatically to energize and de-energize said pumps in sequence, and means coupled to said differential pressure control means and said sequence control mechanism to prevent energizing and deenergizing, respectively, of any of said succeeding pumps for a predetermined period of time.

8. In a closed pressure distribution system having discharge and suction headers, the combination of a plurality of independent pressure fluid supply units coupled to said headers, each normally operable between predetermined high and low differential pressures, a source of power coupled to each unit, a control device coupled to said headers and said sources and responsive to distribution system differential pressure within predetermined high and low differential pressures therein for controlling the sources to effect de-energization and energization respectively of a unit upon rise and fall of system differential pressure above and below the last mentioned differential pressures, the latter being within the range of the first mentioned differential pressures, and time delay means coupled with the control device for delaying for a predetermined time the energization of an incoming unit and de-energization of an outgoing unit respectively upon fall and rise of distribution system differential pressure, the second mentioned differential pressures each being comparatively close to an average differential pressure to be maintained in said system.

9. In a differential pressure distribution system having suction and discharge headers, a plurality of independent differential pressure fluid supply units, an independent power supply coupled to each unit, a distribution system high and low differential pressure operable controls operatively connected to said power supplies and said headers for energizing and de-energizing individual ones of said units upon system differential pressure falling and rising respectively to the said low and high differential pressure of said system, and a single time delay device interposed between said differential controls and the said power supplies to retard energization and de-energization for a predetermined time to each such operation.

References Cited in the file of this patent
UNITED STATES PATENTS

| | | |
|---|---|---|
| 2,458,683 | Cowherd et al. | Jan. 11, 1949 |
| 2,486,256 | Buck | Oct. 25, 1949 |

FOREIGN PATENTS

| | | |
|---|---|---|
| 63,702 | Sweden | Sept. 16, 1925 |
| 338,580 | Great Britain | Nov. 24, 1930 |